Jan. 5, 1954 R. FASZCZUK 2,664,962
AUTOMOTIVE SLEIGH
Filed Aug. 15, 1951
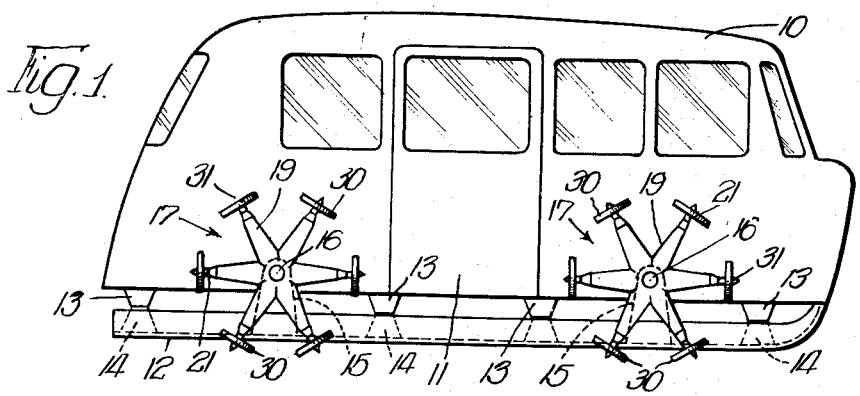
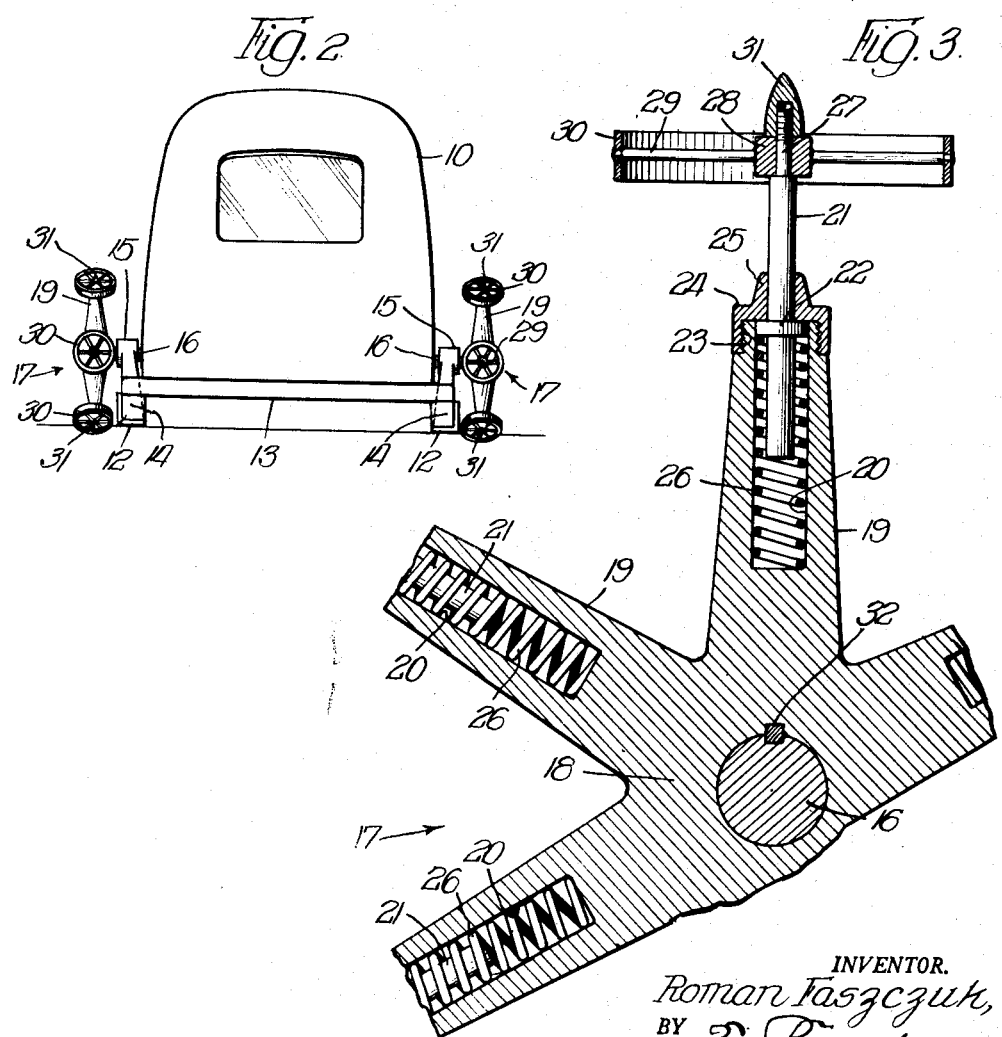
INVENTOR.
Roman Faszczuk,
BY Patented Jan. 5, 1954

2,664,962

UNITED STATES PATENT OFFICE 2,664,962

AUTOMOTIVE SLEIGH

Roman Faszczuk, Chicago, Ill.

Application August 15, 1951, Serial No. 241,987

1 Claim. (Cl. 180—6)

The present invention relates to automotive sleighs and more particularly to the means for propelling the same on the snow.

The principal object of the present invention is the provision of efficient means for propelling the sleighs upon the snow-covered ground.

Another object of the present invention is the provision of a sleigh propelling device, including a wheel of a plurality of radial arms or spokes, each of which carries a telescopically set rod which is yieldable, and which is capable of pushing the sleigh upon the snow-covered ground, when the free end of the rod encounters the snow.

Another object of the present invention is the provision in connection with the rod aforesaid of a guard adjacent the free end thereof, which guard facilitates pushing of the sleigh upon the snow-covered ground.

With the above general objects in view and others that will appear as the invention is better understood, the same consists in the novel construction, combination and arrangement of parts hereinafter more fully described, illustrated in the accompanying drawing and pointed out in the appended claim.

In the drawing forming a part of this application, and in which like designating characters refer to corresponding parts throughout the several views:

Fig. 1 is a side elevational view of the sleigh constructed in accordance with the present invention;

Fig. 2 is a rear elevational view thereof; and

Fig. 3 is an enlarged cross sectional view of the propelling wheel used in connection with the sleigh.

Referring in detail to the present drawing there is shown therein an enclosed body 10, which has a side door 11 constituting access to the body. The body is supported upon a pair of parallelly disposed runners 12, each of which is of an L-shape formation on transverse cross section, as is seen in Fig. 2. The body rests upon a plurality of cross bars 13, which in turn rest by their outer ends upon uprights 14. Said uprights 14 by their lower ends are by any suitable manner affixed to the horizontal portions of runners 12.

Each runner 12 also supports a pair of standards 15, the upper ends of which are disposed above said cross bars 13. Each pair of said standards 15 in a transverse relation with the sleigh supports axle 16, and said axle at each of its ends supports propelling wheel generally indicated by 17. By virtue of this construction it will be seen that there are two pairs of propelling wheels 17 in connection with the sleigh, each pair being upon axle 16 and in transverse relation with the sleigh.

Referring more particularly to the propelling wheel 17 the same includes the hub portion 18 from which a plurality of integrally formed spokes 19 radially projects. Each of said spokes 19 has bore 20 formed therein in a longitudinal central relation therewith, which said bore 20 is open at the outer free end of each spoke 19. Coacting with each spoke 19 is rod 21, which centrally thereof is provided with an integrally formed collar 22, substantially corresponding in diameter to the diameter of bore 20. Said collar 22 is positioned within said bore 20 for a sliding movement in longitudinal relation with spoke 19.

The outer end of spoke 19 is provided with external threads 23 for engaging cap 24. Said cap 24 is provided with nozzle 25 through which said rod 21 projects and within which the same is adapted for sliding movement.

Interposed between said collar 22 and the body portion of spoke 19, adjacent the end of bore 20, is coil spring 26, which is in an encompassing relation with the inner end of said rod 21. Said rod 21 by its inner end does not fully extend throughout the length of said bore 20, but reaches to about one-half length of the latter, so that when said rod 21 is pressed the inner end thereof shifts toward the body portion of said spoke 19, against the tension of spring 26, compressing the latter.

The outer free end of rod 21 is reduced in diameter for effecting extension 27, the outer free end of which is externally threaded. Mounted upon said extension 27 is hub 28 which constitutes a part of the spider, including a plurality of radial rods 29 and wheel rim 30, said rods 29 connecting said rim 30 with hub 28. Said spider is held in a rigid position upon said extension 27 by means of cap 31, threadedly engaging the threaded end of said extension 27. Said hub 28 is clamped between the shoulder of rod 21 resulting from the reduced diameter thereof due to said extension 27 and said cap 31. By virtue of this arrangement said spider is rigid with rod 21.

Each wheel is keyed to the end of axle 16 by means of key 32.

From the hereinabove description it will be readily apparent that when motive power is imparted to axles 16 in order to rotate the same, said wheels 17 will also rotate therewith. When wheel rims 30 strike the ground or the packed snow in succession as the several wheels rotate, this will impart pushing action to the sleigh for propelling the latter forward. As said wheels 17 rotate, and the several spiders, including said wheel rims 30 and caps 31, contact the ground or packed snow, they force rods 21 to shift against the tension of springs 26, and as said spiders and caps 31 leave the ground, during the rotation of said wheels 17, said rods 21 again assume their normal position, with collars 22 in contact with caps 24, as is clearly seen in Fig. 3.

Said rods 29 and rims 30 prevent said spiders from unduly sinking into the snow, but at the same time provide sufficient traction for pushing the sleigh and thereby for propelling the same forward. The substantial extent of each of the rims 30 in the direction of rotation of the wheels 17 causes the leading edge of a rim to strike the snow at an angle and dig in, as can be readily visualized from Fig. 1. This gives each rim 30 a tractive effect throughout a large arc about the axle 16, beginning at the position where the leading edge of the rim touches the snow and continuing until the trailing edge thereof leaves the snow.

It is further observed that the spokes 19 and their cooperating rods 21 are so arranged that rims 30 are disposed below the horizontal portions of runners 12 only a short distance were said runners 12 raised from the ground. This for the purpose of eliminating shifting to any great extent of rods 21 and their collars 22 within spokes 19. This adds to the efficiency of operation of wheels 17, because said rims 30 approaching the ground come in contact therewith at quite sharp angles, as can be readily visualized from the showing in Fig. 1. When spoke 19 with its rod 21 comes into perpendicular relation with the ground rods 29 and rim 30 are flat with the ground having a full play therewith with the resulting maximum traction with the ground.

Hub 28 and rim 30 could be made flat on a plane transverse of extension 27 in order that said hub and said rim may not sink in the snow.

While there is described herein preferred embodiments of the present invention, it is nevertheless to be understood that minor changes may be made therein without departing from the spirit and scope of the invention as claimed.

What I claim as new is:

In an automotive sleigh, a propelling device comprising a first hub, a plurality of spokes extending radially from said hub, each of said spokes being provided with a bore in a longitudinal relation with each of said spokes, a rigid rod extending into said bore for sliding movement axially of said bore and being confined against movement in a direction transverse of the axis of said bore, a resilient member in said bore bearing against said rod for normally maintaining the latter in an extended position with relation to the spoke, the free end of said rod being reduced in diameter for effecting an axial extension upon said rod, said extension in conjunction with the body of said rod defining a shoulder, a rigid second hub inserted upon said extension, a separate, rigid rim member in a substantially spaced relation with said second hub, a plurality of rigid rods fixedly connecting said rim with said second hub, said rim and plurality of rods having surfaces engaging the sleigh supporting surface and being on a plane transverse to the first-mentioned rod, and a generally conical cap threadedly engaging the free end of said extension to clamp said second hub between said shoulder and the base of the cap with the free end of the cap extending beyond the plane of the surfaces of said rim and rods which engage the sleigh supporting surface, the diameter of the base of said cap being small relative to the diameter of said rim, whereby, upon rotation of the first-mentioned hub, the several rim members will successively engage the sleigh supporting surface with the leading edge of each rim member striking the surface at a sufficient angle to dig into said surface and give an immediate tractive effect, which effect is continued over a substantial arc until the trailing edge of said rim is raised from said surface.

ROMAN FASZCZUK.

References Cited in the file of this patent

UNITED STATES PATENTS

| Number | Name | Date |
| --- | --- | --- |
| 778,159 | Walter | Dec. 20, 1904 |
| 975,117 | Bower | Nov. 8, 1910 |
| 1,100,286 | Cornelius | June 16, 1914 |
| 1,144,373 | Morton | June 29, 1915 |
| 1,164,574 | Caton | Dec. 14, 1915 |
| 1,326,548 | Tompkins | Dec. 30, 1919 |
| 1,336,448 | Tollbow | Apr. 13, 1920 |
| 1,345,062 | Bereznay | June 29, 1920 |
| 1,524,599 | Trzeciak | Jan. 27, 1925 |
| 2,390,168 | Piot | Dec. 4, 1945 |
| 2,450,063 | Werner | Sept. 28, 1948 |

FOREIGN PATENTS

| Number | Country | Date |
| --- | --- | --- |
| 597,819 | France | 1925 |